United States Patent Office 3,252,949
Patented May 24, 1966

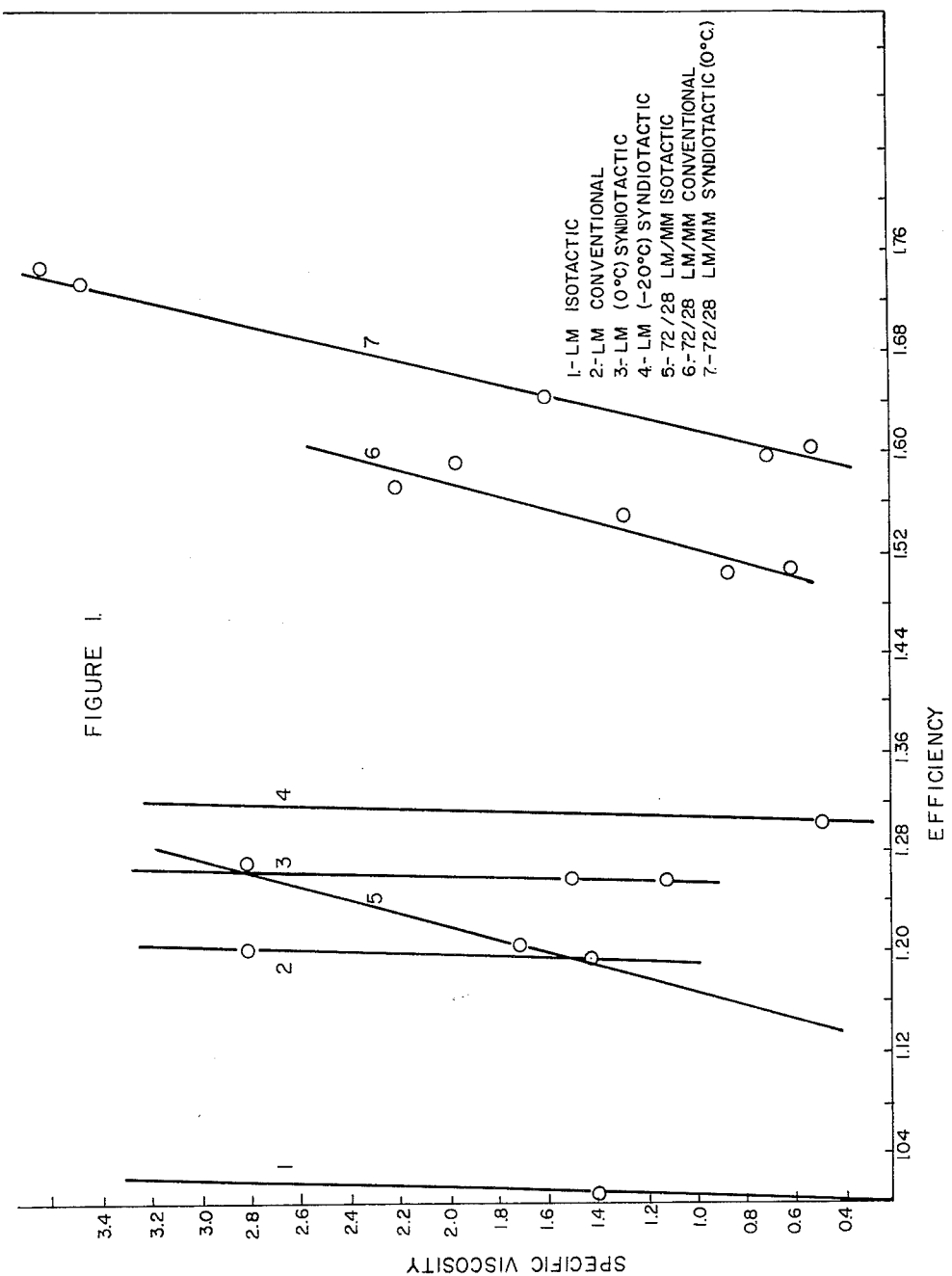

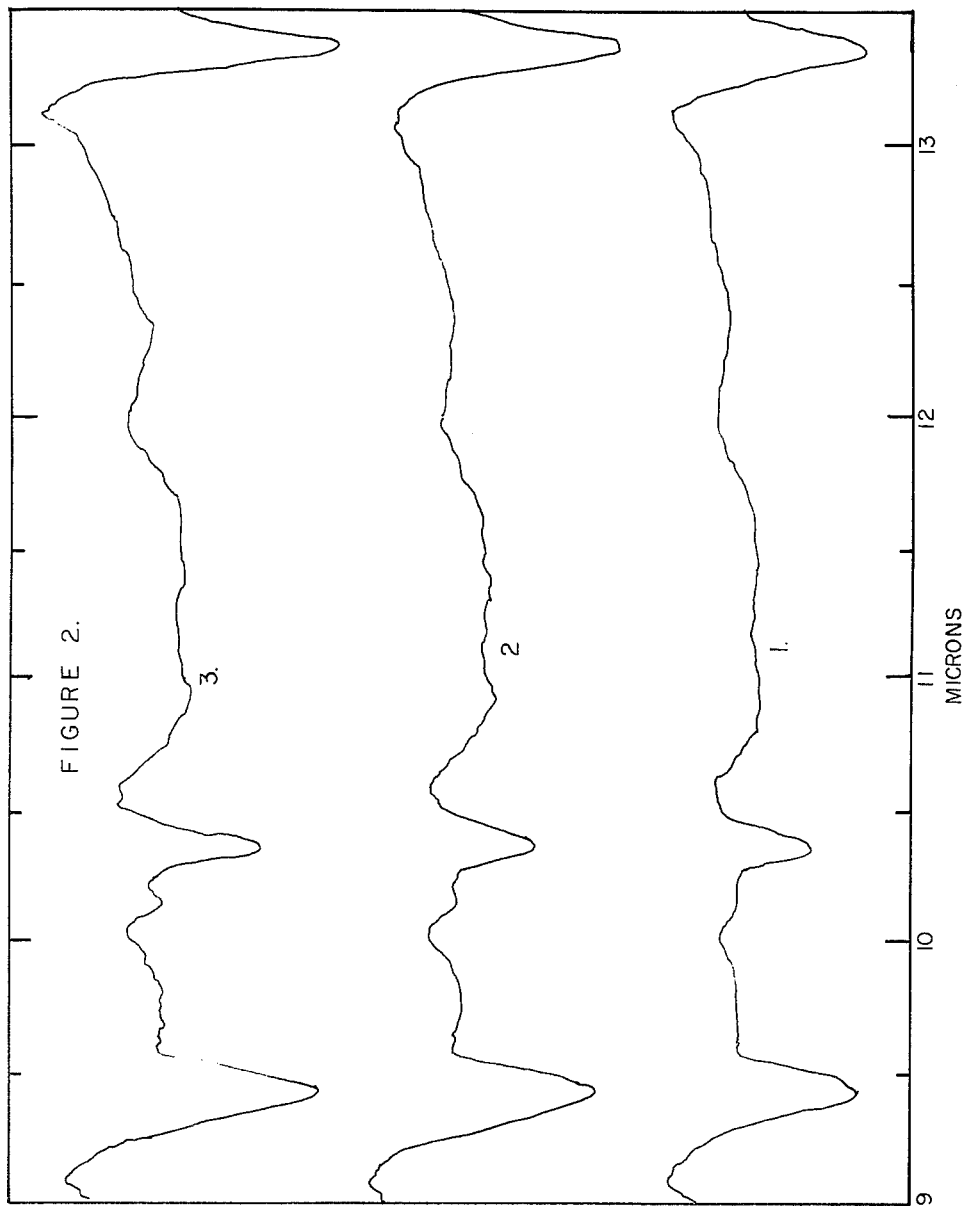

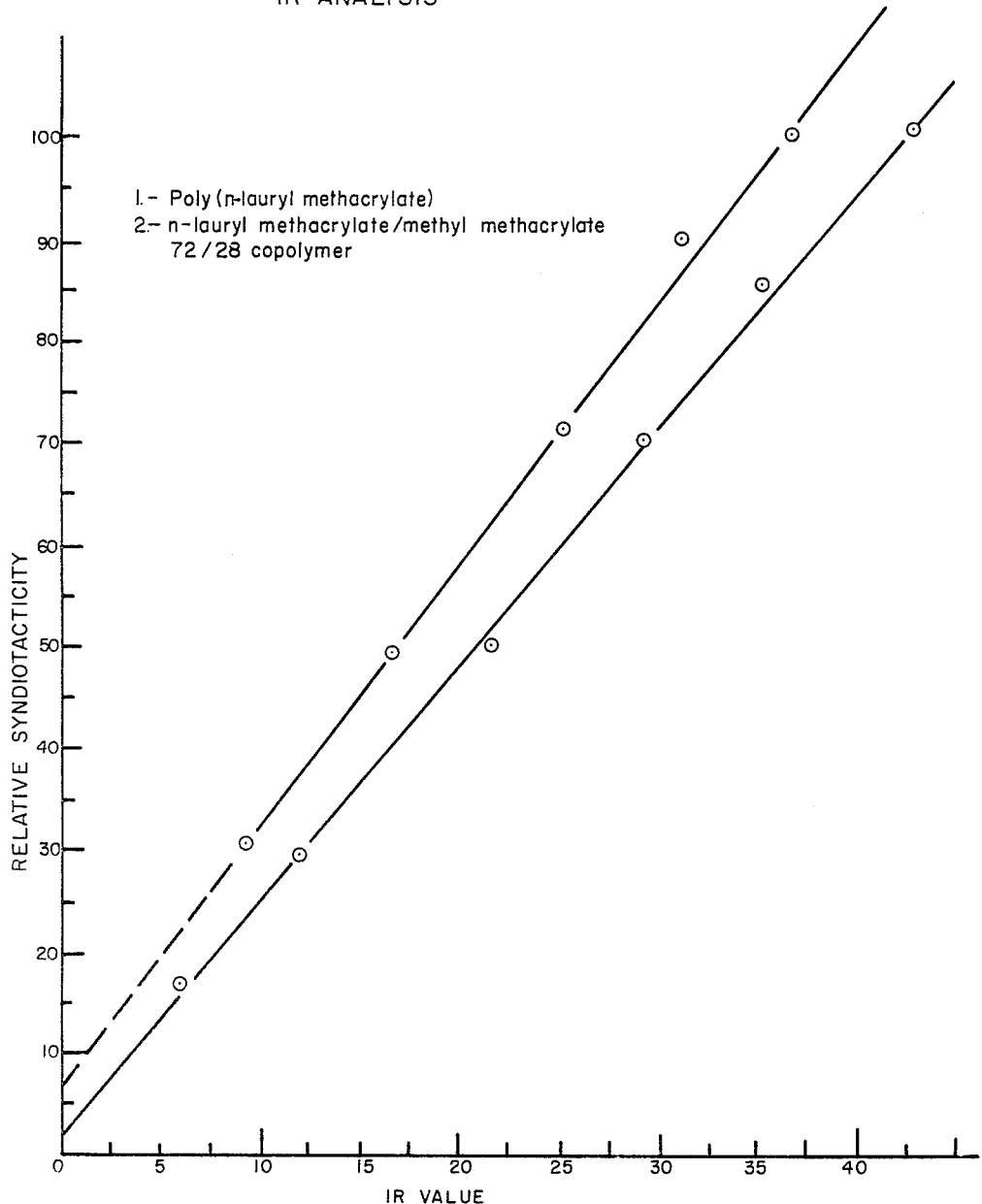
FIGURE 3. SYNDIOTACTICITY FROM DIFFERENTIAL IR ANALYSIS

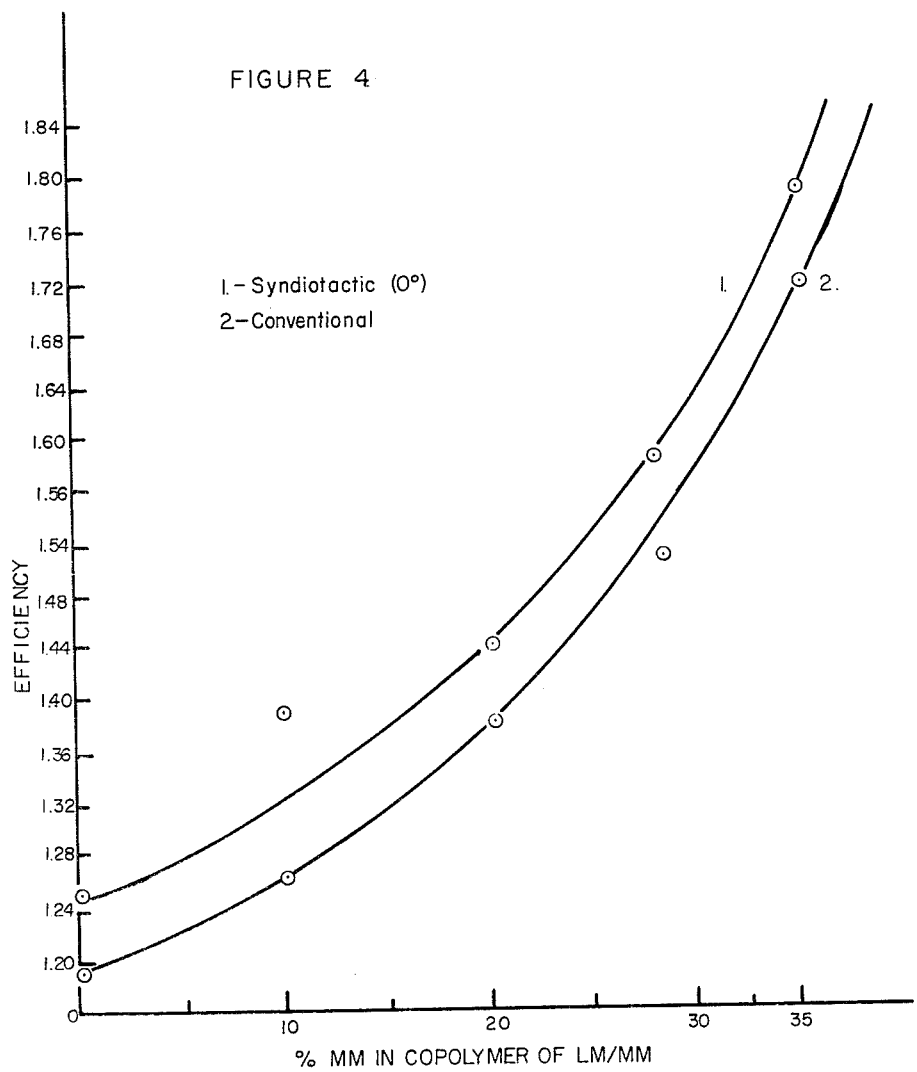

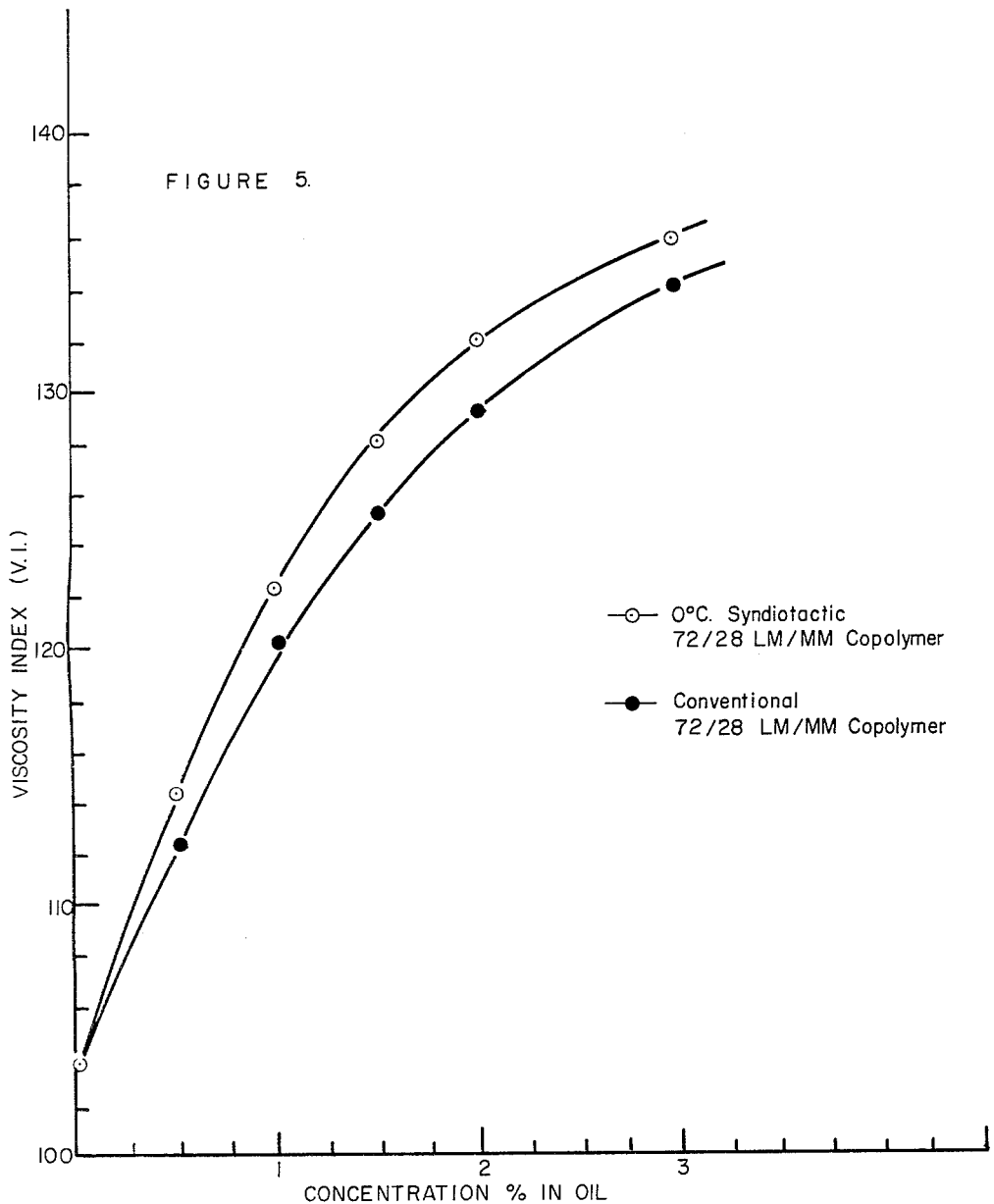

3,252,949
SYNDIOTACTIC OIL-SOLUBLE METHACRYLATE POLYMERS
Joseph E. Fields and Edward H. Mottus, Dayton, Ohio, assignors to Monsanto Company, a corporation of Delaware
Filed Dec. 30, 1960, Ser. No. 79,671
8 Claims. (Cl. 260—80.5)

The invention relates to highly syndiotactic oil-soluble methacrylate polymers having superior viscosity index improving properties when incorporated in mineral and synthetic oils (functional fluids) and to compositions of these polymers in the functional fluids. These polymers can also have dispersancy properties by incorporating a minor amount of an appropriate comonomer during polymerization to give the polymer dispersancy properties or by treatment after the formation of the polymer.

Conventional methacrylate polymers useful as viscosity index improvers in functional fluids are described in U.S. 2,091,627. These polymers are made by free-radical polymerization at about 70° F. or above. Recently methods of making certain stereospecific polymers have been discovered and reported; for example, a paper was presented at the April 1959 meeting of the American Chemical Society, Division of Paint, Plastics and Printing Ink Chemistry titled "Stereospecific Anionic Polymerization of the Methyl Methacrylate," by W. E. Goode et al. This paper is reported in the division's preprints on pages 135–140. Syndiotactic, isotactic, block polymers and conventional polymers are described in this paper.

Also crystalline oil-insoluble polymers of methyl methacrylate and certain other monomers are known as is indicated in Belgium Patent No. 566,713. These methacrylate polymers of the Belgium patent which were made by free radical polymerizations at low temperatures of the order of 0° C. and lower are undoubtedly highly syndiotactic, but of course these polymers are oil-insoluble as will be seen in further discussion of the invention hereinbelow.

The surprising discovery has now been made that the higher the degree of syndiotacticity in methacrylate polymers the better will be the viscosity index improving characteristics of the polymer. Improved oil-soluble methacrylates having relative syndiotacticity in excess of 87 have now been made, which polymers have improved viscosity-index improving qualities as compared to the conventional methacrylate polymers. It is preferred that the relative syndiotacticity of the polymers be at least 90. The significance of the numerical limits on relative syndiotacticity will be clear from the detailed discussion of the invention.

It is an object of this invention to provide new and improved viscosity index improving polymers.

It is another object of this invention to provide new and improved viscosity index improving polymers which also have dispersancy properties.

It is another object of this invention to provide highly syndiotactic oil-soluble methacrylate polymers having superior viscosity index improving characteristics.

It is another object of this invention to provide new and improved mineral and synthetic oil compositions having high viscosity index characteristics.

It is another object of this invention to provide new and improved mineral and synthetic oil compositions having both high viscosity index characteristics and good dispersancy properties.

These and other objects of the invention will become apparent as the detailed description of the invention proceeds.

The new polymers of the invention are made by polymerizing alkyl methacrylate having from about 6 to about 20 carbon atoms in the alkyl group by free-radical polymerization at low temperatures of the order of about 30° C. or lower, preferably 0° C. or lower. Alternatively alkyl methacrylates having from about 8 to about 20 carbon atoms in the alkyl group can be copolymerized with $C_1$–$C_4$ alkyl methacrylates with the amount of the lower alkyl methacrylate in the copolymer being limited to insure that the copolymer is oil soluble, e.g. when a 50/50 molar mixture of methyl methacrylate and lauryl methacrylate is polymerized the resulting polymer is insoluble in mineral lubricating oil; whereas, if the mixture is 35/65 molar of methyl methacrylate and lauryl methacrylate the resulting polymer is soluble in mineral lubricating oil.

In general it can be said that the average number of carbon atoms in alkyl groups of the methacrylate monomers for homopolymers as well as polymers of mixtures of monomers should be at least about 7.5 for the polymer to be soluble in mineral lubricating oil to the extent of at least 1% by weight; whereas, if the oil is a mineral or synthetic hydraulic oil having an appreciably lower viscosity than mineral lubricating oil the average number of carbon atoms in the alkyl groups can be as low as about 6.0 to about 6.5 depending on the particular oil being used. Preferred polymers have an average number of from about 6.0 to about 18 carbon atoms in the alkyl groups. For the purposes of the claims, oil-solubility is defined as the polymer being soluble at 25° C. to the extent of at least 1% in a petroleum base hydraulic fluid meeting Government specifications MIL–O–5606. Preferred polymers have specific viscosities of a 1% solution in benzene at 25° C. in the range of about 0.4 to about 7.0, more preferably in the range of about 0.5 to about 3.0. In the claims the terms "a major amount" and "a minor amount" are used. A major amount means in excess of 50% by weight of the monomer mixture or oil composition, and a minor amount means less than 50% and obviously where there are recited two minor amounts of different monomers they must necessarily add up to less than 50%.

The alkyl methacrylates can either be straight chain alkyl or branched chain except that if it is desired to also use the methacrylate polymer as a pour point improver the alkyl group should be straight chain. The polymers of the invention can also be provided with dispersancy characteristics by polymerizing with the methacrylate monomers a minor amount of polar or hydrophilic monomers. Polar groups are groups such as OH, COOH, $NH_2$, NHR, NRR where the R's are hydrocarbon radicals which can be either substituted or unsubstituted, preferably alkyl groups having up to 4 carbon atoms or cyclohexyl groups. An illustrative but non-limiting listing of such polar monomers is as follows: vinyloxyethanol, dimethylaminoethyl methacrylate, diethylaminopropylmethacrylamide, N-vinylpyridine, N - vinyl - 2 - pyrrolidone, methacrylic acid, acrylic acid; ethylene-1,2-dicarboxylic acids and half esters thereof such as maleic acid, fumaric acids, the mono- or di- chloro-substituted maleic or fumaric acids, alkylated maleic and fumaric acids, mono- or diphenyl maleic acids, benzyl maleic acid, ethyl maleic acid or any similar acids containing a double bond in the chain between two carboxyl groups such as mesaconic and citraconic acids, acids such as itaconic and glutaconic acids, anhydrides of any of the above acids capable of anhydride formation which can be hydrolyzed to give free carboxyl groups, etc. Alternatively, the prepared methacrylate polymers of the invention can be partially amidated or esterified to add the polar groups by treatment with such materials as:

N,N-dimethyl-1,2-ethylenediamine,
N-methyl-N-ethyl-1,2-propylenediamine,
N,N-diethyl-1,3-propylenediamine,
N,N-dipropyl-1,3-propylenediamine, N,N-diisopropyl-1,3-propylenediamine,
N,N-dibutyl-1,3-propylenediamine,
N,N-(di-t-butyl)-1,3-propylenediamine,
N,N,N'-trimethyl-1,3-propylenediamine,
N,N-dicyclohexyl-1,3-propylenediamine,
bis(dimethylaminopropylene)amine,
dimethylamino-p-phenyleneamine;
2-(dimethylamino)ethanol,
2-(methylethylamino)ethanol,
3-(dipropylamino)propanol,
3-(diisopropylamino)propanol,
3-(dibutylamino)propanol,
3-(di-t-butylamino)propanol,
3-(dicyclohexylamino)propanol,
4-(dimethylamino)butanol,
3-(diethylamino)-t-butanol,
dimethylamino-p-phenol, etc.

The polar monomer or the equivalent in partially amidated or esterified polymer should be present in the total polymer in amounts of between about 0.5 and 20% by weight, preferably about 5 to about 15% by weight. Minor amounts of other comonomers can be used, e.g. styrene, vinyl acetate, etc., if desired, to give other desirable characteristics to the polymer.

The polymers of the invention are normally incorporated in mineral or synthetic oils to the extent of at least 0.1% by weight based on the composition of the polymer in oil and normally in amount not in excess of about 15%, except where concentrates are prepared to be blended back with oil in which case the polymer in the concentrate may be from about 20% to 50% or higher. For use as viscosity index improvers usually the polymers will normally be blended in the oils to the extent of from about 1% to about 7% by weight based on the oil composition, but in case the polymer is also a dispersant it can be desirable to use higher than 7%.

For the functional fluid compositions of the invention mineral base oils or synthetic base oils can be used. As viscosity index (V.I.) improvers or as viscosity index improvers and dispersant additives, the polymers of the invention can be added to lubricating oils, diesel oils, furnace oils, hydraulic oils, automatic transmission oils and the like.

Depending on the particular use, it can be desirable for a functional fluid to have high viscosity index. An illustrative but non-limiting list of other functional fluids which are improved in viscosity index and in dispersant characteristics by addition of polymers of the invention are the following: polyphenyls such as biphenyl, the terphenyls such as o-, m- and p-terphenyl and alkylated biphenyl and terphenyls such as the mono- or dialkyl, methyl, ethyl, n-propyl, isopropyl, n-butyl, isobutyl, t-butyl, etc.; partially chlorinated biphenyls known in the trade as "Aroclors" which contain from about 40 to 80% by weight of combined chlorine; poly(oxyphenylene) benzenes and particularly ethers of the formula

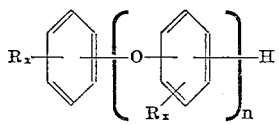

wherein $n$ is an integer from about 3 to about 8, R is an alkyl radical having below about 5 carbon atoms, i.e. methyl, ethyl, n-propyl, isopropyl, n-butyl, isobutyl, t-butyl or mixtures thereof, and $x$ is an integer from 0 to 4; diesters of dicarboxylic acids such as dioctyl sebacate and dioctyl adipate and esters such as pentaerythritol tetracaproate; phosphates such as trialkyl phosphates from tributyl to trilauryl such as tri(2-ethylhexyl) phosphate, dialkyl monoaryl phosphates wherein the alkyl groups are $C_4$–$C_{12}$ and the aryl groups are phenyl or cresyl, particularly dibutyl phenyl phosphate and di(2-ethylhexyl) phenyl phosphate, the monoalkyl diaryl phosphates wherein the alkyl groups are $C_4$–$C_{12}$ and the aryl groups are phenyl and/or cresyl, especially 2-ethylhexyl diphenyl phosphate and 6-methylheptyl diphenyl phosphate, the liquid triaryl phosphates, namely tricresyl phosphate, cresyl diphenyl phosphate and phenyl dicresyl phosphate; liquid polymeric silicones which are well known in the art; etc.

The invention will be more clearly understood from the following detailed description of specific examples thereof read in conjunction with the accompanying drawings wherein:

FIGURE 1 is a graph showing a number of curves of efficiency as a viscosity index improver v. specific viscosity at 100° F. for a number of different methacrylate polymers including isotactic, conventional, and syndiotactic polymers of the invention;

FIGURE 2 is a graph showing several differential infrared curves of several syndiotactic polymers compared with an isotactic polymer;

FIGURE 3 is a graph showing two calibration curves for two different methacrylate polymers, these curves being useful for determining relative syndiotacticity from differential infrared values;

FIGURE 4 shows the effect on efficiency of increasing the amount of methyl methacrylate comonomer with lauryl methacrylate for both conventional methacrylate polymers and syndiotactic polymers of the invention; and FIGURE 5 shows a comparison between the amount of a syndiotactic polymer of the invention required to give a certain viscosity index versus amount required for a comparable conventional methacrylate polymer.

EXAMPLE 1

This sample describes the making of a 90/10 lauryl methacrylate/methyl methacrylate polymer of the invention. To a glass reaction flask was added 22.86 g. (0.09 mole) of lauryl methacrylate, 1.0 g. (0.01 mole) of methyl methacrylate and 20 ml. of dry toluene. The monomers and toluene were mixed and cooled in an ice bath to 0° C. The reaction mixture was blanketed with nitrogen and 0.20 ml. of triethylboron was added. The nitrogen was then displaced with air and the reaction mixture stirred occasionally with the reaction being allowed to run at 0° C. overnight. The product polymer was precipitated in methanol, dissolved in benzene, reprecipitated from methanol, and this sequence of purification steps was repeated once again. The purified polymer was then dried at 50° C. in a vacuum oven overnight. Dry weight of the purified polymer was 18.0 g. An elemental analysis of a sample of this polymer yielded the following results:

| Percent | Found | Calc'd |
| --- | --- | --- |
| C | 74.1 | 74.9 |
| H | 11.4 | 11.7 |

EXAMPLE 2

This example describes the making of an 80/20 lauryl methacrylate/methyl methacrylate polymer of the invention. To the reaction vessel was charged 20.32 g. (0.08 mole) of lauryl methacrylate, 2.0 g. (0.02 mole) of methyl methacrylate and 20 ml. of dry toluene. This experiment was run by exactly the same procedure as the experiment in Example 1 with the same amount of triethylboron catalyst being added as it was in Example 1. The yield of purified dry polymer was 11.1 g. An elemental analysis of a sample of this polymer yielded the following results:

| Percent | Found | Calc'd |
| --- | --- | --- |
| C | 73.4 | 74.1 |
| H | 11.4 | 11.5 |

EXAMPLE 3

This example describes the making of a 65/35 lauryl methacrylate/methyl methacrylate copolymer of the invention. This experiment was run in the same manner as was Example 1 except that the charge of monomers to the reactor was 16.51 g. (0.065 mole) of lauryl methacrylate and 3.5 g. (0.035 mole) of methyl methacrylate. A sample of 20 ml of toluene was charged along with the monomer and the same amount of catalyst was added later as in Example 1. Yield of purified dried polymer was 11.5 g. An elemental analysis of a sample of this polymer yielded the following results:

| Percent | Found | Calc'd |
|---|---|---|
| C | 72.2 | 72.8 |
| H | 11.0 | 11.2 |

EXAMPLE 4

This example describes the preparation of an isotactic polymer from tallow methacrylate, which is a mixture of about 33% by weight of $C_{16}$ and about 67% by weight of $C_{18}$ straight-chain alkyl methacrylates. To the reaction vessel was charged 200 ml. of toluene at 0° C. and nitrogen blanketing was applied. To this toluene in the reaction vessel was added the Grignard catalyst which was 3 ml. of 3 molar phenylmagnesiumbromide in ethyl ether. The tallow methacrylate monomer was purified by percolation over alumina and a sample of this purified material 31.2 g. was added to the reaction vessel over a 24 minute period at a rate to keep the temperature between 0°–5° C. After four hours during which time the reaction mixture was maintained at about 0° C. the reaction mixture was poured into methanol. The crude polymer was recovered from the methanol, dissolved in benzene and precipitated from methanol with this purification procedure being repeated two more times. The purified polymer was then dried in a vacuum oven for 58 hours. Yield of dried polymer was 22.8 g. This polymer is a solid at room temperature.

EXAMPLE 5

This example describes the preparation of a sample of conventional tallow methacrylate polymer. To a "Coke" bottle was charged 65.8 g. of tallow methacrylate, 44 g. of benzene and 0.082 g. of azobisisobutyronitrile catalyst. The bottle was then flushed with nitrogen and sealed. This bottle was placed in a rotating air oven to facilitate agitating reactants and maintained at 70° C. for a period of 65 hours. The polymer product was purified in a manner similar to that described in Example 4. Yield of dried polymer was 65.5 grams.

EXAMPLE 6

This example describes the preparation of a tallow methacrylate polymer of the invention. To the reaction vessel was added 32.9 g. of tallow methacrylate and 25 ml. of toluene. The mixture of toluene and monomer was flushed with nitrogen and cooled to 0° C. Next 0.29 ml. (2 mole percent) of triethylboron was added to the reaction and then 0.145 ml. (1 mole percent) of cumene hydroperoxide was added to the reaction flask. The mixture was thoroughly stirred and allowed to react at 0° C. for 21 hours. The polymer was purified by dissolving in benzene and precipitating in methanol, repeating this procedure two more times. The purified polymer was dried in a vacuum oven at 50° C. for 45 hours. Yield of polymer was 11.5 g.

EXAMPLE 7

This example describes the preparation of a lauryl methacrylate/methyl methacrylate/vinyloxyethanol terpolymer of the invention having both high viscosity index characteristics and dispersant properties. To the reaction flask was added 38.1 g. (0.15 mole) of lauryl methacrylate, 5.0 g. (0.05 mole) of methyl methacrylate, 4.4 g. (0.05 mole) of 2-vinyloxyethanol and 0.3 ml. of pyridine. This mixture of materials was cooled to 0° to 1° C. under nitrogen blanketing and 0.55 ml. of triethylboron was added. After the addition of the triethylboron 0.23 ml. of cumene hydroperoxide was added to the reaction mixture. Polymerization time was 4 hours during which time the temperature was maintained between 1° and 6° C. At the end of the polymerization period, benzene was added to dissolve the polymer. Yield of polymer was 93% and 3.6% vinyloxyethanol (VOE) was found therein.

EXAMPLE 8

This example describes the making of a dispersant polymer of the invention wherein "Lorol" methacrylate, methyl methacrylate and N-vinyl-2-pyrrolidone are the monomers. "Lorol" methacrylate is a mixture of methacrylates made by esterifying methacrylic acid with a mixture of 3% $C_{10}$, 61% $C_{12}$, 23% $C_{14}$, 11% $C_{16}$ and 2% $C_{18}$ straight-chain alkyl alcohols. To the reaction flask was charged 38.1 g. of "Lorol" methacrylate, 5.0 g. of methyl methacrylate and 4.4 g. of N-vinyl-2-pyrrolidone. The mixture of monomers was then cooled to 0° C. under nitrogen, 0.28 ml. of pyridine was added, 0.53 ml. of triethylboron was added and 0.22 ml. of cumene hydroperoxide was added in the order listed to the reaction vessel. Temperatures in the reaction flask were maintained at not more than 5° C. for two hours at which time 48.6 g. of mineral white oil were added. Polymerization was continued for 4 more hours at the same temperatures at which time 47.2 g. additional mineral white oil were added to the reaction mixture. Then the reaction mixture was allowed to stand at room temperature for two days and the polymerization appeared complete. An additional 15.0 g. of mineral white oil were added to the reaction mixture to bring the polymer concentration to 30% by weight.

EXAMPLE 9

This example describes the preparation of a conventional polymer for comparison with the polymer of the invention of Example 8. To a "Coke" bottle was charged 40.2 g. of "Lorel" methacrylate, 5.0 g. of methyl methacrylate, 4.2 g. of N-vinyl-2-pyrrolidone, 32.9 g. of benzene and 0.156 g. of azobisisobutyronitrile. The bottle was flushed with nitrogen, sealed and placed in a rotating oven providing agitation at 68° C. for 4 days. The polymer was recovered from the benzene by precipitating with methanol. Yield of the recovered polymer was 45.8 g. having 0.8% nitrogen.

EXAMPLE 10

This example describes the preparation of a polymer of the invention from "Lorol" methacrylate at 0° C. A 19 g. sample of "Lorol" methacrylate was mixed with dry toluene in a tube. The mixture was bubbled with nitrogen and 0.1 ml. of triethylboron was added. The tube was kept under nitrogen and placed in a Dry-Ice acetone bath. Then 0.3 ml. of 3% $H_2O_2$ was added. The temperature of the bath was too low and "Lorol" methacrylate crystallized out. The reaction tube was then transferred to an ice bath. Total polymerization time at ice bath temperatures was 21 hours. The polymer was precipitated from the reaction mixture with methanol and this polymer was further purified by dissolving in benzene and precipitating with methanol three times. The purified polymer was dried at 50° C. in a vacuum oven overnight. The yield was 7.6 g. of dried polymer.

EXAMPLE 11

This example describes the preparation of a terpolymer of the invention at about 20° C. To a glass reaction vessel were added 29.0 g. of oxo-tridecyl methacrylate, 20.5 g. of tallow methacrylate and 8.0 g. of methyl methacrylate, and nitrogen blanketing was applied. The designation of oxo indicates that the alkyl group is branched rather than straight chain, the alcohol thereof having been made by the well-known Oxo process. Then 0.30 ml. of pyridine and 0.55 ml. of boron triethyl were added to the monomers and the reactor was placed in a water bath. Next 0.23 ml. of cumene hydroperoxide was added and polymerization was carried out with stirring and maintaining the temperature between 17° and 24° C. for a period of 2 hours. At the end of this time benzene was added to bring the polymer into solution and the polymer was purified in the usual manner by precipitation from methanol, redissolving in benzene and precipitating from methanol 2 more times. The purified polymer was dried overnight in a vacuum oven giving 52.1 g. of dry polymer (90.6% yield).

EXAMPLE 12

This example describes the preparation of a dispersant additive of the invention. To a glass reaction vessel fitted with a stirrer and nitrogen inlet and outlet were added 25.4 g. of oxo-tridecyl methacrylate, 18.1 g. of tallow methacrylate, 5.0 g. of methyl methacrylate and 4.4 g. of N-vinyl pyrrolidone. The mixture of monomers were cooled in a water bath and the flask was flushed with nitrogen. Then 0.28 ml. of pyridine and 0.53 ml. of boron triethyl were added to the monomers in the flask. The polymerization was begun at 19° C. with the addition of 0.22 ml. of cumene hydroperoxide. After 45 minutes of polymerization at 19° C., 44.7 g. of mineral white oil were added to the mixture and about 40 minutes later 40.6 g. Additional white oil was added. Then the reaction mixture was allowed to stand at room temperature overnight. The next day 38.3 g. of additional white oil was added to give a 30% by weight polymer concentrate in oil based on monomers charged. The concentrate was heated to 115° C. giving a very viscous solution.

A number of different mineral base oils were used in making up and testing the additive compositions of the invention. These base oils are as follows:

Base oil No. 1

This is a solvent refined Mid-Continent petroleum lubricating oil having the following properties:

| | |
|---|---|
| Viscosity at 210° F., centistokes | 3.94 |
| Viscosity at 100° F., centistokes | 21.58 |
| Viscosity index | 75.3 |
| Specific gravity 25°/25° C. | 0.886 |
| Flash point, Cleveland open cup, ° F. | 375 |

Base oil No. 2

This oil is a solvent refined Mid-Continent petroleum lubricating oil having the following properties:

| | |
|---|---|
| Viscosity at 210° F., centistokes | 10.39 |
| Viscosity at 100° F., centistokes | 91.73 |
| Viscosity index | 103.4 |
| Flash point, Cleveland open cup, ° F. | 450 |

Base oil No. 3

This oil is a petroleum lubricating oil having a naphthenic base and the following physical characteristics:

| | |
|---|---|
| Density, $d_4^{20}$ | 0.8943 |
| Refractive index, $n_D^{20}$ | 1.4912 |
| Distillation point 50%, ° C. | 321 |
| Average molecular weight | 250 |
| Viscosity at 210° F., centistokes | 9.84 |
| Viscosity at 100° F., centistokes | 109.69 |
| Viscosity index | 68.4 |

Base oil No. 4

This oil is an SAE-10 winter grade petroleum oil which is highly paraffinic and has the following physical characteristics:

| | |
|---|---|
| Density, $d_4^{20}$ | 0.8638 |
| Refractive index, $n_D^{20}$ | 1.4762 |
| Distillation point 50%, ° C. | 344 |
| Average molecular weight | 275 |
| Viscosity at 210° F., centistokes | 5.74 |
| Viscosity at 100° F., centistokes | 37.23 |
| Viscosity index | 103.7 |

In Table 1 below is contained a summary of Examples 1–12 and the viscosity index improving characteristics of the polymers of these examples. In addition are summarized a number of other examples of polymers which were used to obtain data for the figures or for other purposes later discussed.

TABLE 1

| Ex. No. | Monomers [1] | Monomer, Mole Ratio | Type of Polymer | Sp. Visc. in Benzene at 1% Conc. and 25° C. | Sp. Visc.[2] at 100° F. | Sp. Visc.[2] at 210° F. | Efficiency [3] |
|---|---|---|---|---|---|---|---|
| 1 | LM/MM | 90/10 | Syndiotactic | | 0.299 | 0.415 | 1.39 |
| 2 | LM/MM | 80/20 | do | | 0.540 | 0.777 | 1.44 |
| 3 | LM/MM | 65/35 | do | | 0.172 | 0.308 | 1.79 |
| 4 | TM | | Isotactic | 0.315 | 0.483 | 0.519 | 1.08 |
| 5 | TM | | Conventional | | 1.793 | 2.052 | 1.14 |
| 6 | TM | | Syndiotactic | | 1.717 | 2.029 | 1.18 |
| 7 | LM/MM/VOE | 60/20/20 | do | 1.209 | 0.699 | 1.198 | 1.79 |
| 8 | LoM/MM/VP | 62.5/20.8/16.7 | do | | 0.819 | 0.395 | [3] 1.70 |
| 9 | LoM/MM/VP | 60.9/21.7/17.4 | Conventional | | 0.570 | 0.851 | [3] 1.49 |
| 10 | LM | | Syndiotactic | 1.008 | 1.488 | 1.874 | 1.26 |
| 11 | OTM/TM/MM | 43.3/24.9/31.8 | (20° C.) Syndiotactic | 1.345 | 1.395 | 2.022 | 1.45 |
| 12 | OTM/TM/MM/VP | 39.6/22.9/20.8/16.7 | do | | 1.386 | 1.908 | 1.38 |
| 13 | LM | | Isotactic | 0.953 | 1.399 | 1.413 | [3] 1.01 |
| 14 | LM | | Conventional | 0.968 | 1.421 | 1.699 | 1.20 |
| 15 | LM | | do | 1.761 | 2.812 | 3.379 | 1.20 |
| 16 | LM | | Syndiotactic | 0.798 | 1.109 | 1.391 | 1.25 |
| 17 | LM | | do | 1.752 | 2.804 | 3.553 | 1.27 |
| 18 | LM | | (−20° C.) Syndiotactic | 0.432 | 0.480 | 0.626 | 1.30 |
| 19 | LM/MM | 72/28 | Isotactic | 2.280 | 1.708 | 2.054 | 1.20 |
| 20 | LM/MM | 72/28 | Conventional | 0.790 | 0.622 | 0.937 | 1.51 |
| 21 | LM/MM | 72/28 | do | 0.836 | 0.654 | 0.985 | 1.51 |
| 22 | LM/MM | 72/28 | do | 0.889 | 0.793 | 1.199 | 1.51 |
| 23 | LM/MM | 72/28 | do | 1.125 | 0.866 | 1.306 | 1.51 |
| 24 | LM/MM | 72/28 | do | 1.429 | 1.270 | 1.966 | 1.55 |
| 25 | LM/MM | 72/28 | do | 2.630 | 1.965 | 3.124 | 1.59 |
| 26 | LM/MM | 72/28 | do | 2.965 | 2.217 | 3.488 | 1.57 |
| 27 | LM/MM | 72/28 | Syndiotactic | 0.690 | 0.548 | 0.876 | 1.60 |
| 28 | LM/MM | 72/28 | do | 0.913 | 0.711 | 1.136 | 1.60 |
| 29 | LM/MM | 72/28 | do | 2.122 | 1.591 | 2.612 | 1.64 |

See footnotes at end of table.

TABLE 1—Continued

| Ex. No. | Monomers [1] | Monomer, Mole Ratio | Type of Polymer | Sp. Visc. in Benzene at 1% Conc. and 25° C. | Sp. Visc.[2] at 100° F. | Sp. Visc.[2] at 210° F. | Efficiency [2] |
|---|---|---|---|---|---|---|---|
| 30 | LM/MM | 72/28 | Syndiotactic | 4.620 | 3.461 | 5.993 | 1.73 |
| 31 | LM/MM | 72/29 | do | 4.836 | 3.628 | 6.335 | 1.75 |
| 32 | LM/MM | 72/28 | (−20° C.) Syndiotactic | 0.270 | 0.240 | 0.376 | 1.57 |
| 33 | LM/MM | 72/28 | Isotactic | 1.434 | 1.086 | 1.184 | 1.09 |
| 34 | LM/MM | 72/28 | Syndiotactic | 0.683 | 0.541 | 0.828 | 1.53 |
| 35 | LM/MM | 90/10 | Conventional | | 1.233 | 1.563 | 1.27 |
| 36 | LM/MM | 80/20 | do | | 1.114 | 1.541 | 1.38 |
| 37 | LM/MM | 65/35 | do | | 0.679 | 1.165 | 1.72 |
| 38 | LM/MM | 50/50 | Isotactic | 4.169 | Insoluble in Base Oil No. 2 | | |
| 39 | LM/MM | 65/35 | Syndiotactic | 0.523 | 0.426 | 0.740 | 1.74 |
| 40 | OTM/TM/MM/VP | 39.6/22.9/20.8/16.7 | do | | 0.689 | 0.953 | 1.38 |

[1] LM—Lauryl methacrylate.
MM—Methyl methacrylate.
TM—Tallow methacrylate.
VOE—Vinyloxyethanol.
LoM—"Lorol" methacrylate.
VP—N-vinyl-2-pyrrolidone.
OTM—Oxotridecyl methacrylate.
[2] These specific viscosities and efficiencies were determined from a 30% concentrate of the polymer in Base Oil No. 1 diluted to 3% polymer in Base Oil No. 2.
[3] These specific viscosities and efficiencies were determined from a 30% concentrate of the polymer in white mineral oil diluted to 3% polymer in Base Oil No. 2.

The experiments of Examples 13–40 were carried out in an analogous fashion to corresponding isotactic, conventional or syndiotactic Examples 1–12. Under the column titled "Type of Polymer" in Table 1 all syndiotactic polymers were made at about 0° C. except as indicated differently, i.e., "(20° C.) Syndiotactic" means the polymer was made at about 20° C. and "(−20° C.) Syndiotactic" means the polymer was made at −20° C. In general the "Type of Polymer" has been determined qualitatively by the method of making the polymer, but also a number of the polymers have been subjected to infrared analysis (to be distinguished from differential infrared analysis later discussed). Isotactic or syndiotactic polymers have their own characteristic infrared patterns. Efficiency is a measure of the viscosity-temperature coefficient of a polymer in the solvent in which the measurements are made.

$$\text{Efficiency} = \frac{\text{Specific Viscosity at 210° F.}}{\text{Specific Viscosity at 100° F.}}$$

In general the higher the efficiency the higher is the viscosity index.

The curves of FIGURE 1 are plotted from data found in Table 1. Abbreviations used in the key of FIGURE 1 have been previously defined in Table 1 and detailed experimental examples. Efficiency as a viscosity index improver is plotted in this figure versus the specific viscosity of the polymer at 100° F. Using lauryl methacrylate as a monomer, samples of isotactic polymer, samples of conventional polymer, samples of highly syndiotactic polymer prepared at 0° C. and samples of very highly syndiotactic polymer prepared at −20° C. were made. From a different monomer system namely lauryl methacrylate/methyl methacrylate in a molar ratio of 72/28 respectively, samples of isotactic, conventional and 0° C. syndiotactic polymers were prepared. If the curves for polylaurylmethacrylate are examined, it is seen that the least efficient polymers are the isotactic and the most efficient are the most syndiotactic. The same conclusion is reached if the curves of lauryl methacrylate/methyl methacrylate polymers are examined. Furthermore, it can be concluded that there is a tremendous difference in the efficiency between the isotactic and the highly syndiotactic polymers. Conventional oil-soluble methacrylate polymers are predominantly syndiotactic but are appreciably less syndiotactic than the polymers of the invention. It appears that the higher the syndiotacticity the greater is the efficiency. Thus the highly syndiotactic polymers of the invention are appreciably improved over the conventional polymers as to efficiency.

Among the different ways in which the polymers were compared was by the use of a differential infrared spectrometer. In FIGURE 2 are shown three curves of infrared spectra resulting from a comparison of 3 different polymers with a standard isotactic polymer. The samples were each dissolved to a concentration of 15% in a mineral white oil. A standard sample against which all samples were compared for the figure was the isotactic polymer of Example 19. Against this isotactic polymer were compared a sample formed by mixing 30 parts of the isotactic polymer with 70 parts of the polymer of Example 32. Curve #1 is a differential infrared curve resulting from a comparison of the mixed polymer with the isotactic polymer. Curve #2 results from a comparison of the conventional polymer of Example 25 with the isotactic polymer of Example 19, and Curve #3 results from a comparison of the isotactic polymer of Example 19 with the syndiotactic polymer of Example 32. These curves of FIGURE 2 are merely exemplary of similar curves which are obtained with other polymers. The abscissas of FIGURE 2 are wave length in microns. The ordinates of FIGURE 2 for the various curves are staggered so the curves can be more easily compared one with the other. The ordinates of the curves merely represent the intensity of the infrared light as recorded in the spectrometer after passing through the samples and being compared.

FIGURE 3 represents a chart for determining relative syndiotacticity from differential infrared values for two different polymers, one being a poly-lauryl methacrylate polymer and the other a copolymer of lauryl methacrylate and methyl methacrylate in molar ratio of 72/28. The two polymers used to obtain the polymer blend from which the calibration charts were made for the poly-lauryl methacrylate polymer are the polymers of Examples 13 and 18 and the polymer of Example 13 has been assigned a relative isotacticity of 100 or a relative syndiotacticity of 0 and the polymer of Example 18 has been assigned a relative syndiotacticity of 100 or a relative isotacticity of 0. The polymers used for making copolymer calibration Curve 2 are the polymers of Examples 19 and 32, and these polymers have been assigned relative syndiotacticities of 0 and 100, respectively and the reverse in relative isotacticity. These polymers were then subjected to differential infrared analysis as described above with relation to FIGURE 2 and the results of these experiments are shown below in Tables 2 and 3. As in FIGURE 2 the comparison was always made versus the isotactic sample. After carefully examining the differential infrared spectra of a large number of different polymers, two different pairs of peaks and valleys were picked as significantly indicative of the amount of syndiotacticity in the polymers. These pairs were the peak 9.05 and the valley 9.40 pair and the peak 13.1 and the valley 13.38 pair. Thus the infrared intensity recorded at 9.05 minus that at 9.40 was one measurement and the infrared intensity recorded at 13.1 microns minus the intensity at 13.38 microns gave the other measurement. The total differences were the sum of these two in each case. These data are plotted in Table 2 below for the poly-(lauryl methacrylate) polymer.

TABLE 2

| Ex. 18 [1] (Syndiotacticity) | 9.05–9.40μ Difference | 13.1–13.38μ Difference | Total Difference |
|---|---|---|---|
| 100 | 18.5 | 18.2 | 36.7 |
| 90.2 | 16.0 | 15.2 | 31.2 |
| 71.1 | 12.5 | 12.8 | 25.3 |
| 49.4 | 8.5 | 8.3 | 16.8 |
| 30.5 | 5.6 | 3.7 | 9.3 |
| 0 | | | |

[1] This column represents the percent by weight of Example 18 polymer in mixtures of Example 18 and Example 13 polymers.

The data in Table 2 are plotted in Curve #1 of FIGURE 3. This calibration Curve 1 is then suitable for determining the relative syndiotacticity of an unknown poly-(lauryl methacrylate) polymer from differential infrared analysis.

In a similar manner to that described for obtaining the data of Table 2, the data of Table 3 were obtained using the polymers of Examples 19 and 32 representing relative syndiotacticities of 0 and 100, respectively. Thus the data for the 72/28 molar lauryl methacrylate/methyl methacrylate copolymer calibration curve were obtained and plotted in Curve 2 of FIGURE 3.

TABLE 3

| Ex. 32 [1] (Syndiotacticity) | 9.05–9.40μ Difference | 13.1–13.38μ Difference | Total Difference |
|---|---|---|---|
| 100 | 20.4 | 22.6 | 43.0 |
| 85.3 | 17.1 | 18.3 | 35.4 |
| 69.9 | 14.3 | 15.0 | 29.3 |
| 50.0 | 10.0 | 11.5 | 21.5 |
| 29.3 | 5.8 | 6.2 | 12.0 |
| 16.4 | 3.0 | 3.0 | 6.0 |
| 0 | | | |

[1] This column represents the percent by weight of Example 32 polymer in a mixture of Example 32 and Example 19 polymers.

This calibration Curve 2 is then suitable for determining the relative syndiotacticity of an unknown 72/28 molar copolymer of lauryl methacrylate and methyl methacrylate from differential infrared analysis.

Differential infrared analysis were made comparing the isotactic polymer of Example 13 with the conventional polymer of Example 14 and comparing the isotactic polymer of Example 19 with the conventional polymer of Example 25. Then using Curve 1 of FIGURE 3 for the first pair and Curve 2 of FIGURE 3 for the second pair, relative syndiotacticities were determined. The conventional poly(n-lauryl)methacrylate of Example 14 was found to have a relative syndioctacticity of 83.5 and the conventional n-lauryl methacrylate/methyl methacrylate 72/28 copolymer of Example 25 was found to have a relative syndioctacticity of 82. These values of relative syndioctacticity for conventional oil-soluble methacrylates are a little higher but approximately the same as reported in the literature for conventional methyl methacrylate polymers.

Relative syndiotacticity limits for the claims are defined in an analogous fashion as they were for FIGURE 3, i.e. each different type of polymer such as poly (tallow methacrylate) or different copolymer would require its own calibration curve to determine accurately the amount of relative syndiotacticity. The polymer made at −20° C. by the free-radical catalysis is assigned 100 relative syndiotacticity or a relative isotacticity of 0, and the polymer made at about 0° C. using the Grignard catalyst is assigned the number 0 relative syndiotacticity or a relative isotacticity of 100. From differential infrared analysis of blends of these samples, a calibration curve can be plotted which curve is useful in determining the degree of relative syndiotacticity of analogous polymers of unknown relative syndiotacticity.

In FIGURE 4 are shown two curves, one for syndiotactic polymers and the other for conventional polymers wherein efficiency is plotted versus the percent methyl methacrylate in copolymers of lauryl methacrylate and methyl methacrylate. Abbreviations used in this figure have been previously defined in Table 1. It is indicated from this curve that the higher the percentage of methyl methacrylate in the copolymers the higher will be the efficiency of the polymer; however, the higher the percentage of methyl methacrylate in the copolymer the less soluble is the copolymer and a 50/50 copolymer is completely insoluble in mineral lubricating oil. It is seen from this curve that the comparable syndiotactic polymers as compared to the conventional polymers have in each case higher efficiencies. The data for FIGURE 4 are contained in Table 4 below.

TABLE 4

0° C. Syndiotactic

| Example No. | Mole Percent MM [1] in Copolymer | Efficiency |
|---|---|---|
| 16 | 0 | 1.25 |
| 1 | 10 | 1.39 |
| 2 | 20 | 1.44 |
| ([2]) | 28 | 1.58 |
| 3 | 35 | 1.79 |

Conventional

| Example No. | Mole Percent MM [1] in Copolymer | Efficiency |
|---|---|---|
| 14 | 0 | 1.20 |
| 35 | 10 | 1.27 |
| 36 | 20 | 1.38 |
| 20 | 28 | 1.51 |
| 37 | 35 | 1.72 |

[1] MM stands for methyl methacrylate.
[2] This value was taken from a curve in Figure 1.

The efficiencies of Table 4 were determined from a 30% concentrate of the polymer in Base Oil No. 1 diluted to 3% polymer in Base Oil No. 2.

In the curves of FIGURE 5 are illustrated one of the main advantages of the polymers of the invention over comparable conventional polymers. Abbreviations have been previously defined in Table 1. It is customary in blending additives into lubricating oils to add a sufficient amount of the additive to produce a given viscosity index. It is clearly indicated from FIGURE 5 that an appreciably larger amount of conventional polymer will be required to blend to a certain viscosity, say 130 viscosity index as compared to the amount of syndiotactic polymer required. Thus an appreciable savings in cost of additives is made by using the syndiotactic polymer rather than the conventional. The data used to plot the FIGURE 5 curve are contained in Table 5.

TABLE 5

0° C. Syndiotactic

| Example No. | Centistokes at 100° F. | Centistokes at 210° F. | Percent Polymer in Oil | Viscosity Index |
|---|---|---|---|---|
| 28 | 156.88 | 22.09 | 3.0 | 135.9 |
|  | 131.43 | 17.587 | 2.0 | 131.8 |
|  |  |  | 1.5 | [1] 127.9 |
|  | 109.85 | 13.630 | 1.0 | 122.4 |
|  |  |  | 0.5 | [1] 114.3 |

Conventional

| Example No. | Centistokes at 100° F. | Centistokes at 210° F. | Percent Polymer in Oil | Viscosity Index |
|---|---|---|---|---|
| 21 | 151.66 | 20.65 | 3.0 | 134.1 |
|  | 128.07 | 16.58 | 2.0 | 129.2 |
|  |  |  | 1.5 | [1] 125.0 |
|  | 108.37 | 13.20 | 1.0 | 120.1 |
|  |  |  | 0.5 | [1] 112.5 |

[1] These are not the results of experimentally measured viscosities but are rather calculated from values taken from viscosity curves of the experimental data.

The viscosities in Table 5 above were determined from a 30% concentrate of the polymer in Base Oil No. 1 diluted to the percent polymer in oil shown by adding Base Oil No. 2.

It was desired to see the effect of the polymers of the invention as viscosity index improving additives in different types of base oil. Therefore, blends to 3% concentration in oil were made up of one of the syndiotactic polymers of the invention in a paraffinic oil, a naphthenic oil and in an oil which was a mixed blend of paraffinic and naphthenic oil. Data for these tests are shown in Table 6. Also shown in Table 6 is the effect of a comparable conventional additive in the different base oils.

An examination of the data in Table 7 above indicates that the syndiotactic polymers of the invention tend to form very appreciably smaller amounts of the deposits than do the conventional and isotactic polymer. The Panel Coker tests are an indication of how a lubricant oil additive will be likely to perform in an internal combustion or diesel engine.

Table 8 below sets forth the data of the testing of dispersant additives of the invention in a carbon black dispersion test. This method tests the ability of the additives to hold carbon black dispersed in kerosene. The testing is carried out both in the presence of and in the absence of water since some additives tend to leach out and be-

TABLE 6.—EFFECT OF BASE OIL ON V.I. AND EFFICIENCY

| Base oil | Base Oil V.I. | Specific Viscosity at— | | Efficiency | V.I. |
|---|---|---|---|---|---|
| | | 100° F. | 210° F. | | |
| [3% in oil of Ex. 28 (Syndiotactic LM/MM 72/28) Polymer] | | | | | |
| Paraffinic (Base Oil No. 4) | 103.7 | 0.944 | 1.372 | 1.45 | 149.3 |
| Naphthenic (Base Oil No. 3) | 68.4 | 0.841 | 1.332 | 1.58 | 126.6 |
| Mixed (Base Oil No. 2) | 103.7 | 0.711 | 1.124 | 1.58 | 136.1 |
| [3% in oil of Ex. 21 (Conventional LM/MM 72/28) Polymer] | | | | | |
| Paraffinic (Base Oil No. 4) | 103.7 | 0.860 | 1.188 | 1.38 | 147.2 |
| Naphthenic (Base Oil No. 3) | 68.4 | 0.760 | 1.138 | 1.50 | 123.2 |
| Mixed (Base Oil No. 2) | 103.7 | 0.654 | 0.937 | 1.51 | 134.1 |

A particularly important characteristic of the syndiotactic polymers of the invention is their low deposit formation as measured in the "Panel Coker" test. The standard "Panel Coker" test is described in reports of the Fifth World Petroleum Congress. In this report a model B Panel Coker is described. The Panel Coker actually used in the tests was a model C which has motor and spinning shaft mounted horizontally instead of slanting. Also the shaft and side air holes were sealed off to prevent stray air currents and the introduction of air was provided via a needle inserted through the Teflon shaft seal. Running conditions were as follows:

Panel temperature—550° F.
Running time—12 hours
Time cycle—15 seconds splash and 45 seconds motor off
Air flow—2.3 liters/hour
Panel composition—aluminum
Formulation—3% of the additive in SAE 10W-30 stock with conventional inhibitors and metallic detergent.

In this test the oil being tested is splashed up against a hot panel. The deposit forming tendencies of the oil are then measured at the end of the testing time by weighing the amount of deposit on the panel. A summary of these tests comparing a viscosity index improver of the invention with an isotactic V.I. improver and a conventional V.I. improver are are follows:

TABLE 7.—PANEL COKER TESTS OF LM/MM 72/2 POLYMERS [1]

| Example No. | Type of Polymer | Panel Deposits, Milligrams |
|---|---|---|
| 33 | Isotactic | 154.5 |
| 20 | Conventional | 33.7 |
| 34 | Syndiotactic | 5.3 |

[1] The polymers were copolymers of lauryl methacrylate and methyl methacrylate in molar ratio of 72/28, respectively.

come ineffective in the presence of water. A carbon black concentrate is made up to 15% by weight of carbon in a highly refined mineral white oil. One gram of this carbon paste is added to a 25 by 150 mm. culture test tube with a plastic closed top, and to the flask are then added 30 g. of kerosene. Thus, the concentrate af carbon based on the kerosene presence is 0.5% by weight. Then 0.5% by weight based on the active ingredients present of the various dispersants to be tested are weighed into separate test tubes, containing the kerosene and carbon black. The test tube is sealed and the ingredients dispersed by 15 minutes of shaking by hand. To the test, wherein water is present, 1 volume percent of water (about 0.4 ml.) is added to the other ingredients in the test tube. The test tubes after being thoroughly agitated are placed in a rack and observations of the degree of settling are made periodically. The results in Table 8 are reported in the time for complete settling, the time when partial settling was observed, or the number of days that the testing was run before it was terminated when no settling was observed. The tests were conducted at room temperature.

TABLE 8.—CARBON BLACK DISPERSION

| Additive | Weight Percent | Time for Carbon Black to Settle— No Water Present [1] | Time for Carbon Black to Settle— Water Present |
|---|---|---|---|
| None | | CS—5 minutes | CS—5 minutes. |
| Example 7 | 0.5 | NS—14 days | CS—24 hours. |
| Example 8 | 0.5 | NS—14 days | CS—4 days. |
| Example 9 | 0.5 | NS—21 days | |
| Example 12 | 0.5 | NS—10 days; PS—12 days. | |

[1] NS—Not Settled. PS—Partly Settled. CS—Completely Settled.

In Table 9 below the viscosity index improving effect of polymers of the invention in a number of different types of functional fluids are shown.

TABLE 9.—VISCOSITY INDEX EFFECT IN FUNCTIONAL FLUIDS

| No. | Composition | Kin. Visc., cs. | | V.I. |
|---|---|---|---|---|
| | | 100° F. | 210° F. | |
| 1 | Mineral oil hydraulic fluid (MIL-O-5606) | 3.81 | 1.45 | 126.9 |
| 2 | No. 1 plus 3% polymer of Example 40 [1] | 11.25 | 4.10 | 252.4 |
| 3 | No. 1 plus 3% polymer of Example 34 [1] | 10.05 | 3.82 | 256.0 |
| 4 | No. 1 plus 3% polymer of Example 39 | 8.54 | 3.49 | 260.4 |
| 5 | No. 1 plus 2% polymer of Example 38 [2] | 17.28 | 8.09 | 202.5 |
| 6 | Dibutyl phenyl phosphate | 4.23 | 1.51 | 109.3 |
| 7 | No. 6 plus 3% polymer of Example 39 | 7.91 | 3.48 | 272.6 |
| 8 | No. 6 plus 3% polymer of Example 38 [2] | 45.37 | 20.19 | 167.4 |
| 9 | 10% by wt. tricresyl phosphate plus 90% by wt. "Aroclor 1242" [3]. | 19.21 | 2.55 | −248.8 |
| 10 | No. 9 plus 3% polymer of Example 34 [1] | 66.5 | 9.74 | 127.8 |
| 11 | No. 9 plus 3% polymer of Example 40 [1] | 68.6 | 10.07 | 128.9 |
| 12 | Pentaerythritol tetracaproate | 19.39 | 4.13 | 134.0 |
| 13 | No. 12 plus 3% polymer of Example 34 [1] | 41.35 | 9.29 | 161.5 |

[1] Polymer concentration is on a pure polymer basis, but the polymer was added to the functional fluid as a 30% concentrate in Base Oil No. 1.
[2] This is an isotactic polymer and not a polymer of the invention.
[3] This is a partially chlorinated biphenyl.

Thus it is seen from the data of Table 9 that the polymers of the invention are not only useful in mineral oils as viscosity index improvers but also in a large number of other different types of functional fluids. Composition No. 5 and No. 8 although not involving a polymer of the invention demonstrates the solubility in a phosphate and a mineral hydraulic oil of a polymer that is not soluble in mineral lubricating oil, and polymers of the invention behave similarly.

In addition to the polymeric additives of this invention, auxiliary additives can also be use din conjunction with the functional fluid compositions of the invention. For example, in the case of mineral lubricating oils such additives include color stabilizers such as alkyl amines, e.g. tri-n-butyl amine or 2,4,6-tri(dimethylaminoethyl)phenol; metal deactivators, e.g. 1,2-diaminopropane; antioxidant, corrosion inhibitors and the like. Other additives include pour point depressant such as the "Acryloids," antifoaming agents such as silicone polymers, corrosion, friction, and oxidation inhibitors, e.g. alkyl phenols, alkyl phosphates, and salts thereof, blooming agents, metal containing detergents, and the like. The polymeric additives can also be used when they have low temperature detergency properties supplementary to high temperature detergents such as for example, barium sulfonates, barium $P_2S_5$ hydrocarbon reaction products, etc. These auxiliary additives may be used in amounts varying from about 0.05% to about 5% by weight or higher. Actually if a mixture of straight-chain alcohols is used to make the methacrylic monomers, the polymer made therefrom will in addition to having high viscosity index characteristics also be useful as a pour point depressant.

Although the invention has been described in terms of specified embodiments which are set forth in considerable detail, it should be understood that this is by way of illustration only and that the invention is not necessarily limited thereto, since alternative embodiments and operating techniques will become apparent to those skilled in the art in view of the disclosure. Accordingly modifications are contemplated which can be made without departing from the spirit of the described invention.

What is claimed is:
1. An oil-soluble alkyl polymethacrylate having a relative syndiotacticity of at least 87 and from about 6 to about 20 carbon atoms in alkyl group.
2. An oil-soluble polymer having a relative syndiotacticity of at least 87 comprising a mixture of $C_8$–$C_{20}$ alkyl methacrylate and an amount of $C_1$–$C_4$ alkyl methacrylate insufficient to form an oil-insoluble polymer.
3. An oil-soluble polymer having a relative syndiotacticity of at least 87 comprising a major amount of a mixture of oxo-tridecyl and tallow methacrylates and a minor amount of methyl methacrylate.
4. An oil-soluble polymer of a mixture of $C_{10}$–$C_{18}$ straight-chain alkyl methacrylates and having a relative syndiotacticity of at least 87.
5. An oil-soluble polymer having a relative syndiotacticity of at least 87 comprising a major amount of lauryl methacrylate and a minor amount of methyl methacrylate.
6. An oil-soluble polymer having a relative syndiotacticity of at least 87 comprising a major amount of a mixture of $C_{10}$–$C_{18}$ straight-chain alkyl methacrylates and a minor amount of methyl methacrylate.
7. An oil-soluble polymer having a relative syndiotacticity of at least 87 and dispersant characteristics comprising a major amount of a mixture of oxo-tridecyl and tallow methacrylates, a minor amount of methyl methacrylate and a minor amount of N-vinyl-2-pyrrolidone.
8. An oil-soluble polymer having a relative syndiotacticity of at least 87 and dispersant characteristics comprising a major amount of a mixture of $C_{10}$–$C_{18}$ straight-chain alkyl methacrylates, a minor amount of methyl methacrylate and a minor amount of N-vinyl-2-pyrrolidone.

References Cited by the Examiner
UNITED STATES PATENTS

| 1,986,260 | 1/1935 | Fulton | 252—77 |
| 2,370,663 | 3/1945 | Hill | 252—77 |
| 2,720,511 | 10/1955 | Cupery et al. | 260—86.1 |
| 2,839,512 | 6/1958 | Barnum et al. | 260—86.1 |
| 2,892,822 | 6/1959 | Gray et al. | 260—86.1 |
| 2,895,938 | 7/1959 | Ohlinger et al. | 260—85.5 |
| 2,956,900 | 10/1960 | Fettes | 260—89.5 |
| 3,050,785 | 8/1962 | Cunningham | 260—89.5 |
| 3,103,503 | 9/1963 | Fox et al. | 260—89.5 |

OTHER REFERENCES

Garrett et al.: JACS, vol. 81, Feb. 20, 1959.
Fox et al.: Jour. Amer. Chem. Soc., vol. 80, pp. 1768–9 (1958).
Miller et al.: J. Pol. Sc., vol. 55, pp. 643–656 (1961).
Schildknecht: Vinyl and Related Polymers, John Wiley & Sons, Inc., New York (1952).

JOSEPH L. SCHOFER, Primary Examiner.
JULIUS GREENWALD, HAROLD N. BURSTEIN, DONALD E. CZAJA, Examiners.
R. D. EDMONDS, H. WONG, Assistant Examiners.

UNITED STATES PATENT OFFICE
CERTIFICATE OF CORRECTION

Patent No. 3,252,949                      May 24, 1966

Joseph E. Fields et al.

It is hereby certified that error appears in the above numbered pat ent requiring correction and that the said Letters Patent should read as corrected below.

Column 4, line 32, "sample" should read -- example --. Column 5, line 6, "(0035 mole)" should read -- (0.035 mole) --. Column 6, line 51, "Lorel" should read -- Lorol --. Columns 7 and 8, TABLE 1, seventh column, line 8 thereof, "0.395" should read -- 1.395 -- Columns 9 and 10, TABLE 1, third column, line 2 thereof, "72/29" should read -- 72/28 --. Columns 13 and 14, TABLE 6, heading to the first column, "Base oi" should read -- Base oil --; same TABLE 6, first column, last line thereof, "Mixed (Base Oi No. 2)" should read -- Mixed (Base Oil No. 2) --. Column 13, TABLE 7, in the heading to the table, line 1, "72/2" should read -- 72/28 --. Column 14, line 43, "af carbon" should read -- of carbon --.

Signed and sealed this 29th day of July 1969.

(SEAL)
Attest:

EDWARD M.FLETCHER,JR.
Attesting Officer

WILLIAM E. SCHUYLER, J
Commissioner of Patent